United States Patent
Choi et al.

(10) Patent No.: US 11,114,907 B2
(45) Date of Patent: Sep. 7, 2021

(54) MOTOR ROTOR ASSEMBLY AND METHOD OF ALIGNING POLE CENTER OF PERMANENT MAGNET THEREOF

(71) Applicant: LG ELECTRONICS INC., Seoul (KR)

(72) Inventors: Woosoo Choi, Seoul (KR); Min Gi Kim, Seoul (KR); Joonsik Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 16/713,738

(22) Filed: Dec. 13, 2019

(65) Prior Publication Data

US 2020/0204017 A1  Jun. 25, 2020

(30) Foreign Application Priority Data

Dec. 19, 2018  (KR) .................. 10-2018-0165678

(51) Int. Cl.
*H02K 1/27* (2006.01)
*H02K 1/24* (2006.01)

(52) U.S. Cl.
CPC ............. *H02K 1/274* (2013.01); *H02K 1/24* (2013.01)

(58) Field of Classification Search
CPC .......... H02K 1/274; H02K 1/24; H02K 15/03; H02K 2213/03; H02K 1/2733; H02K 1/27; H02K 1/28
See application file for complete search history.

(56) References Cited

U.S. PATENT DOCUMENTS

2007/0080597 A1* 4/2007 Suzuki ................ H02K 1/2733
310/156.47

* cited by examiner

*Primary Examiner* — Thomas Truong
(74) *Attorney, Agent, or Firm* — Dentons US LLP

(57) ABSTRACT

The present disclosure relates to a motor rotor assembly and a method of aligning a pole center of a permanent magnet thereof. The motor rotor assembly includes a permanent magnet including a plurality of disc type magnet units which have center holes and are segmented in an axial direction, first and second shafts coupled to both end portions of the permanent magnet, a rod which protrudes from a center of the first shaft in the axial direction, is coupled to a center of the second shaft, and passes through the center hole of each of the plurality of disc type magnet units to assemble the permanent magnet, and a sleeve which surrounds an outer circumferential surface of the permanent magnet and fixes the permanent magnet to the first and second shafts, wherein, when the plurality of disc type magnet units are assembled, the plurality of disc type magnet units are formed to have a small amount of magnetic force, pole centers of the disc type magnet units adjacent to each other are aligned due to an attractive force and a repulsive force therebetween, and after the assembly, the plurality of disc type magnet units are fully magnetized to have a preset maximum magnetic force, and polarities of the disc type magnet units, which are adjacent to each other, are formed to be the same.

20 Claims, 8 Drawing Sheets

(PRIOR ART)

(PRIOR ART)

MOTOR ROTOR ASSEMBLY AND METHOD OF ALIGNING POLE CENTER OF PERMANENT MAGNET THEREOF

CROSS-REFERENCE TO RELATED APPLICATION

This application claims priority to and the benefit of Korean Patent Application No. 10-2018-0165678, filed on Dec. 19, 2018, the disclosure of which is incorporated herein by reference in its entirety.

BACKGROUND

1. Field of the Disclosure

The present disclosure relates to a motor rotor assembly and a method of aligning a pole center of a permanent magnet thereof.

2. Background

In the case of a motor which rotates at high speed (for example, a brushless direct current (BLDC) motor), a rotor is formed with only a magnet instead of a rotor core so as to reduce a rotational inertia in a rotator structure.

For example, a conventional rotor includes a pair of shafts, a permanent magnet disposed between and coupled to the pair of shafts, and a sleeve which fixes the shafts to the permanent magnet.

Meanwhile, in a case in which segment magnets are applied to a motor which rotates at high speed, an effect of reducing eddy current loss may be expected, and there is an advantage in that the permanent magnet is easily manufactured.

However, even when the segment magnets have specific marks, there are problems in that pole centers are misaligned during an assembly process and target performance is not achieved.

In an effort to solve the problems, in the case of the conventional motor, specific marks are made on the magnets to align the pole centers of the segment magnets, but a phenomenon in which the pole centers are misaligned frequently occurs during the assembly process. In addition, although a method of forming specific patterns on magnets to align pole centers has been researched, there are problems in that a work period and cost are increased.

U.S. Pat. No. 9,356,481 discloses a rotor structure for a motor.

As illustrated in FIG. 1, the disclosed rotor structure includes a single permanent magnet 60, and a shaft 10 inserted through an axial direction hole 61 of the permanent magnet 60. Meanwhile, fixing seats 70 are coupled to upper and lower portions of the permanent magnet 60. In addition, first and second coupling portions 63 and 73 are coupled using uneven patterns between the permanent magnet 60 and the fixing seats 70 to firmly fix the permanent magnet 60.

However, in using this method, in a case in which the number of permanent magnets increases, there is a disadvantage in that pole centers of the permanent magnets may not be aligned except for the permanent magnets disposed in uppermost and lowermost portions. In addition, according to the method, there is a problem in that a work period and cost are increased due to machining of the uneven patterns in concave or convex forms on the permanent magnets.

Meanwhile, FIG. 2 is a schematic view illustrating another rotor structure for aligning pole centers of a plurality of disc type permanent magnets.

As illustrated in the drawing, in order to form a permanent magnet 60 by segmenting into a plurality of disc type magnet units 60-1, 60-2, 60-3, and 60-4 around a rod 10 in an axial direction, machining work is needed to align pole centers.

Specifically, alignment reference patterns 10*a* and 10*b* should be formed on the rod 10, and corresponding patterns 61*a* and 61*b* should be formed in center holes 61 of the plurality of disc type magnet units 60-1, 60-2, 60-3, and 60-4.

Accordingly, such a method has problems in that a machining period is increased and machining cost is greatly increased. In addition, according to the method, since a machining error rate is increased, there is a high possibility of occurrence of an assembly problem or misalignment of the pole centers of the permanent magnets after assembly.

SUMMARY

The present disclosure is directed to providing a motor rotor assembly manufactured by assembling a plurality of disc type magnet units forming a permanent magnet with a rod through a quick and simple method.

The present disclosure is directed to providing a motor rotor assembly capable of having aligned polarities by applying a small magnetic force before assembly to align pole centers of upper and lower magnets using an attractive force and a repulsive force between the magnets and fully magnetizing the magnets after the assembly.

Objectives of the present disclosure are not limited to the above described objectives, and other objectives, which are not described above, and advantages may be more clearly understood through the following descriptions and clearly understood through embodiments of the present invention. In addition, it may be easily seen that the objectives and the advantages of the present disclosure may be realized using means and combinations thereof described in the appended claims.

According to one aspect, there is provided a motor rotor assembly including a permanent magnet including a plurality of disc type magnet units which have center holes and are segmented in an axial direction, a first shaft and a second shaft coupled to both end portions of the permanent magnet, a rod which protrudes from a center of the first shaft in the axial direction, is coupled to a center of the second shaft, and passes through the center hole of each of the plurality of disc type magnet units to assemble the permanent magnet, and a sleeve which surrounds an outer circumferential surface of the permanent magnet and fixes the permanent magnet to the first and second shafts, wherein, when the plurality of disc type magnet units are assembled, the plurality of disc type magnet units are formed to have a small amount of magnetic force, pole centers of the disc type magnet units adjacent to each other are aligned to each other due to an attractive force and a repulsive force therebetween, and after the assembly, the plurality of disc type magnet units are fully magnetized to have a preset maximum magnetic force, and polarities of the disc type magnet units, which are adjacent to each other, are formed to be the same.

In this case, the rod may include a reference guide which is positioned close to the first shaft and guides a coupling direction of at least one disc type magnet unit, which is assembled first using the rod, among the plurality of disc type magnet units to fix a coupling position.

For example, the reference guide may have an expanded form to have a diameter greater than a diameter of the rod and includes at least one alignment pattern. In addition, the center hole of the at least one disc type magnet unit assembled first may have a diameter corresponding to the expanded diameter of the reference guide and include at least one alignment pattern coupling portion corresponding to the at least one alignment pattern. As a specific example, the at least one alignment pattern may be at least one D-cut protrusion formed on an outer circumferential surface of the reference guide, and the at least one alignment pattern coupling portion may include at least one D-cut groove corresponding to the at least one D-cut protrusion. As described above, the reference guide fixes a position of the disc type magnet unit assembled first (or initially) using the rod, and the disc type magnet unit of which the position is fixed as described above becomes a reference when the pole centers of the remaining disc type magnet units, which are sequentially assembled later, are aligned. That is, the position of the at least one disc type magnet unit which is the reference is fixed by the reference guide. Accordingly, a specific process of aligning the pole centers of the remaining plurality of disc type magnet units is not needed except for the one disc type magnet unit which is the reference, and a process of aligning all the pole centers can be completed only by simply assembling all the remaining plurality of disc type magnet units with the rod because an attractive force and a repulsive force are applied to the disc type magnet units adjacent to each other. Accordingly, there is an advantage in that a manufacturing period and cost may be significantly reduced.

In addition, a male screw may be formed on a protruding front end portion of the rod, and a female screw may be formed at the center of the second shaft coupled to the rod. For example, since release prevention should be secured when the male screw and the female screw rotate, the male screw and the female screw may have left-hand screw forms.

According to another aspect, there is provided a method of manufacturing a motor rotor assembly which includes a permanent magnet including a plurality of disc type magnet units which have center holes and are segmented in an axial direction, a first shaft and a second shaft coupled to both end portions of the permanent magnet, a rod which protrudes from a center of the first shaft in the axial direction, is coupled to a center of the second shaft, and passes through the center hole of each of the plurality of disc type magnet units to assemble the permanent magnet, and a sleeve which surrounds an outer circumferential surface of the permanent magnet and fixes the permanent magnet to the first and second shafts, the method includes applying a small amount of magnetic force to the plurality of disc type magnet units to have the small amount of magnetic force by applying an external magnetomotive force to the plurality of disc type magnet units, assembling the disc type magnet units in an axial direction using the rod and aligning pole centers of the plurality of disc type magnet units using an attractive force and a repulsive force between the disc type magnet units adjacent to each other, and fully magnetizing the plurality of disc type magnet units to have a preset maximum magnetic force after fixing, by the sleeve, the plurality of disc type magnet units of which the pole centers are aligned.

In this case, the method may further include, before the assembling of the disc type magnet units, forming a reference guide by guiding a coupling direction of at least one disc type magnet unit, which is assembled first using the rod at a position of the rod close to the first shaft, among the plurality of disc type magnet units.

For example, in the forming of the reference guide, the reference guide may be is positioned close to the first shaft, have an expanded form to have a diameter greater than a diameter of the rod, and include at least one alignment pattern, and the at least one alignment pattern may be coupled to at least one corresponding alignment pattern coupling portion provided in the center hole of the at least one disc type magnet unit assembled first. In this case, the at least one alignment pattern may be at least one D-cut protrusion formed on an outer circumferential surface of the reference guide, and the at least one alignment pattern coupling portion may be at least one D-cut groove corresponding to the at least one D-cut protrusion. As described above, a position of the disc type magnet unit assembled first (or initially) is fixed using the rod through the forming of the reference guide, and the disc type magnet unit of which the position is fixed as described above becomes a reference when the pole centers of the remaining disc type magnet units, which are sequentially assembled later, are aligned. Accordingly, since the position of the at least one disc type magnet unit which is the reference is fixed at the reference guide, a specific process of aligning the pole centers of the remaining plurality of disc type magnet units is not needed. Accordingly, all the pole centers can be aligned only by simply assembling all the remaining plurality of disc type magnet units with the rod except for the one disc type magnet unit which is the reference because an attractive force and a repulsive force are applied to the disc type magnet units adjacent to each other. Then, since all the plurality of disc type magnet units can have aligned polarities through full magnetization in a state in which the assembly is completed, the polarities can be quickly and simply aligned.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
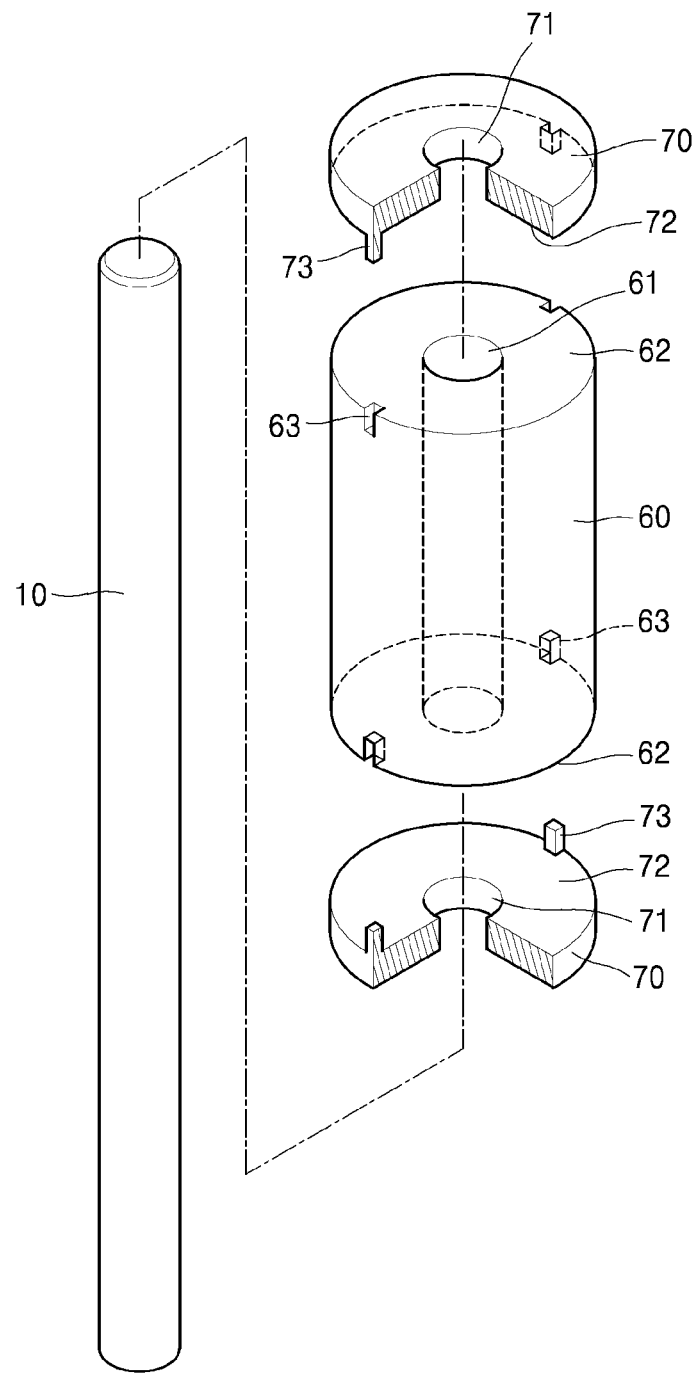
FIG. 1 is a schematic view illustrating a prior art rotor structure.
Figure 2:
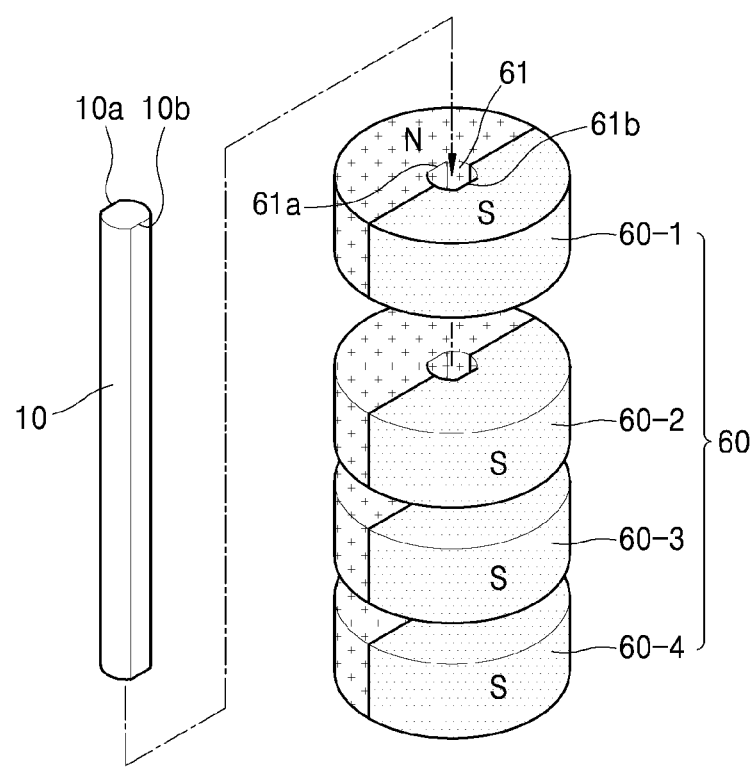
FIG. 2 is a schematic view illustrating another prior art rotor structure for aligning pole centers of a plurality of disc type permanent magnets.

Hereinafter, embodiments of the present invention will be described in detail with reference to the accompanying drawings in order for those skilled in the art to easily perform the present invention. The present invention may be implemented in several different forms and is not limited to the embodiments described herein.

Parts irrelevant to the description may be omitted in order to clearly describe the embodiments of the present invention, and the same or similar parts may be denoted by the same reference numerals throughout this specification. In addition, some embodiments of the present invention will be described in detail with reference to exemplary drawings. When the reference numerals are assigned to elements of each drawing, and the same or similar elements are illustrated in different drawings, the same reference numerals may be assigned to the same or similar elements if possible. Also, in the descriptions of the embodiments of the present invention, when detailed descriptions of related known configurations or functions are deemed to unnecessarily obscure the gist of the embodiments of the present invention, they may be omitted.

In descriptions of components of the embodiments of the present invention, it should be understood that, when an element is referred to as being "connected or coupled" to another element, the element may be directly connected or coupled to another element, still another element may be interposed therebetween, or the elements may be connected or coupled by still another element.

In the following description, a motor means a motor which rotates at high speed, for example, a high speed brushless direct current (BLDC) motor, but is not limited thereto. In the case of the motor which rotates at high speed, a rotor assembly may be formed of a permanent magnet instead of a rotor core to reduce a rotational inertia. In addition, in a case in which a plurality of segmented magnets (hereinafter, magnet units) are applied to the motor which rotates at high speed, an effect of reducing eddy current loss may be expected. In addition, there is an advantage in that the permanent magnet may be easily manufactured.

Hereinafter, a motor rotor assembly and a method of aligning a pole center of a permanent magnet according to an embodiment of the present invention will be described with reference to the accompanying drawings.

Figure 3:
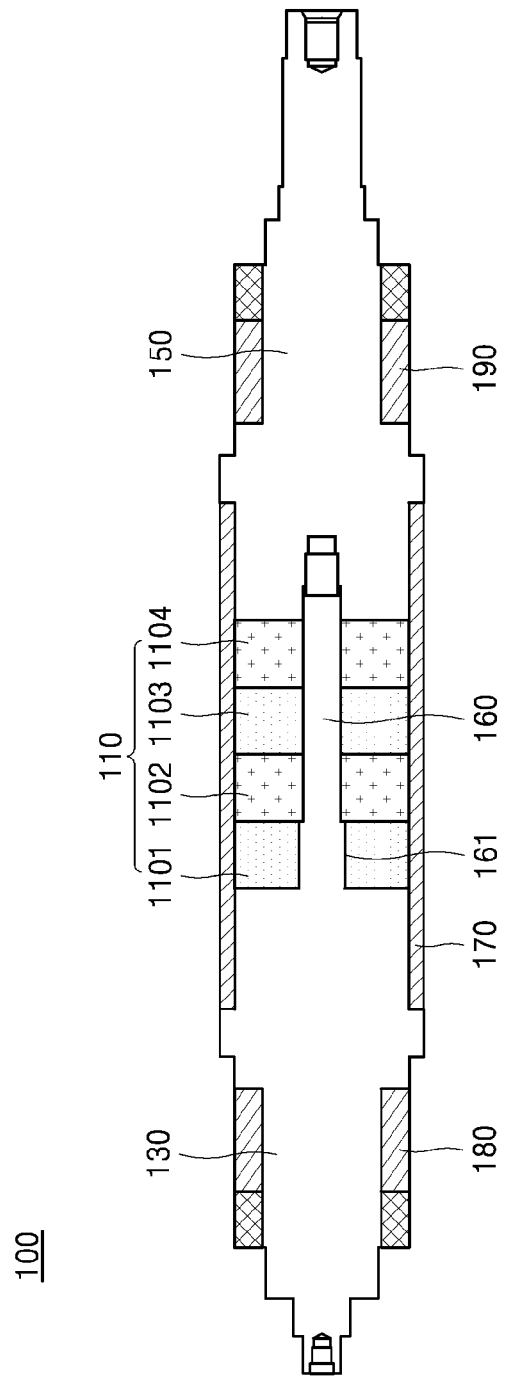
FIG. 3 is a schematic cross-sectional view illustrating a motor rotor structure according to one embodiment of the present invention.

FIG. 3 is a schematic cross-sectional view illustrating a motor rotor structure according to one embodiment of the present invention.

Referring to FIG. 3, a motor rotor structure 100 according to one embodiment of the present invention includes a permanent magnet 110, a first shaft 130, a second shaft 150, a rod 160, and a sleeve 170.

The permanent magnet 110 includes a plurality of disc type magnet units 1101, 1102, 1103, and 1104. A center hole is formed in each of the plurality of disc type magnet units 1101, 1102, 1103, and 1104, and the plurality of disc type magnet units 1101, 1102, 1103, and 1104 are segmented in an axial direction to form the permanent magnet 110.

The first shaft 130 is coupled to one end portion (for example, a left side of the permanent magnet according to FIG. 3) of the permanent magnet 110. In addition, the second shaft 150 is coupled to the other end portion (for example, a right side of the permanent magnet according to FIG. 3) of the permanent magnet 110. In other words, the second shaft 150 may be coupled to a side opposite to a side at which the first shaft 130 is connected.

The rod 160 may be a member having a rod form and connecting the first shaft 130 and the second shaft 150.

The rod 160 may protrude from a center of the first shaft 130 in the axial direction to have a predetermined length. In this case, a protruding front end portion of the rod 160 may be coupled to a center of the second shaft 150.

For example, a male screw is formed on the protruding front end portion of the rod 160, and a female screw to be coupled to the male screw may be formed at the center of the second shaft 150 coupled to the rod 160.

In addition, the male screw formed on the protruding front end portion of the rod 160 and the female screw formed in the center of the second shaft 150 may have left-hand screw forms. Accordingly, when the first and second shafts 130 and 150 rotate, release of screw coupling therebetween is prevented by the rod 160 so that a release of coupling therebetween may be prevented.

As described above, the rod 160 is connected to the first and second shafts 130 and 150 along inner centers thereof in a longitudinal direction, is disposed to pass through the center hole of the permanent magnet 110 disposed between and coupled to the first and second shafts 130 and 150, and is assembled with the permanent magnet 110.

The sleeve 170 surrounds an outer circumferential surface of the permanent magnet 110 and serves to fix the permanent magnet 110 to the first and second shafts 130 and 150.

As a specific example, the sleeve 170 may be formed in a tube form capable of simultaneously surrounding and fixing outer circumferential surfaces of the plurality of disc type magnet units 1101, 1102, 1103, and 1104 and at least parts of the first and second shafts 130 and 150 which are connected thereto.

Meanwhile, at least one or more bearings 180 and 190 may be provided on the first and second shafts 130 and 150.

The bearings 180 and 190 support both end portions of the first and second shafts 130 and 150 and may reduce rotational friction when the first and second shafts 130 and 150 rotate. However, installation positions and forms of the bearings 180 and 190 are not limited to the illustrated forms, and the installation positions and forms may be changed according to various embodiments.

Meanwhile, the permanent magnet 110 according to the embodiment of the present invention includes the plurality of disc type magnet units 1101, 1102, 1103, and 1104 segmented in the axial direction.

The plurality of disc type magnet units 1101, 1102, 1103, and 1104 are formed to have a small amount of magnetic force before assembly and are fully magnetized to have preset maximum magnetic force after the assembly is completed, for example, when the sleeve 170 is fixed to the plurality of disc type magnet units 1101, 1102, 1103, and 1104.

Figure 6:
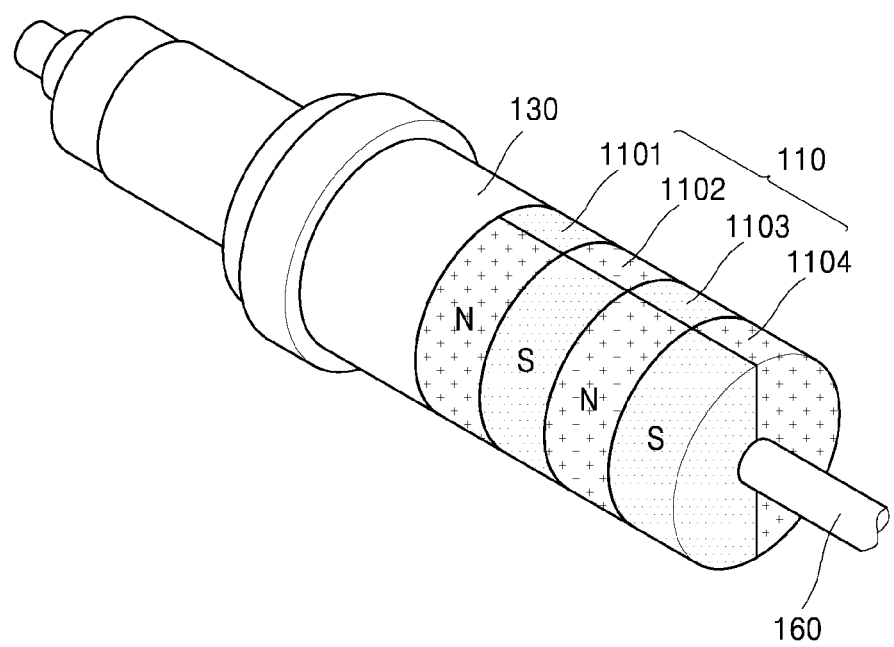

Accordingly, since the plurality of disc type magnet units 1101, 1102, 1103, and 1104 have only the a small amount of magnetic force when being assembled, in a state in which the plurality of disc type magnet units 1101, 1102, 1103, and 1104 are assembled, an attractive force and a repulsive force are applied between the plurality of disc type magnet units 1101, 1102, 1103, and 1104 adjacent to each other, and thus pole centers of the plurality of disc type magnet units 1101, 1102, 1103, and 1104 may be aligned (see FIG. 6).

Figure 8:
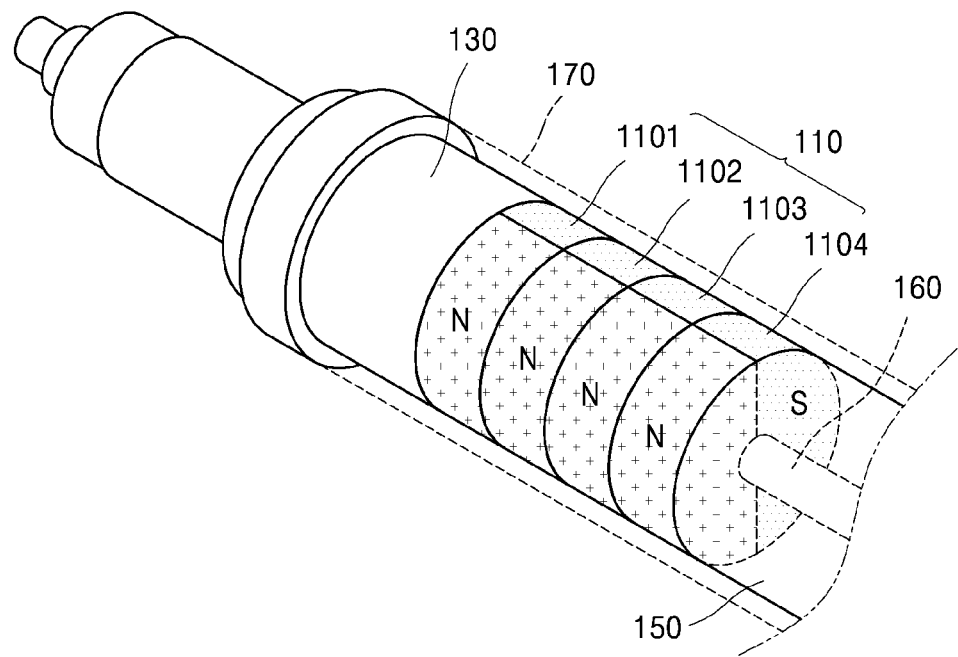
FIG. 8 is a view illustrating a form in which polarities of all permanent magnets are aligned through the full magnetization process of the motor rotor structure according to one embodiment of the present invention.

In addition, in a state in which the plurality of disc type magnet units 1101, 1102, 1103, and 1104 including the aligned pole centers are completely assembled and fixed by the sleeve 170, the plurality of disc type magnet units 1101, 1102, 1103, and 1104 are fully magnetized and completely aligned such that the same polarities of the plurality of disc type magnet units 1101, 1102, 1103, and 1104 adjacent to each other face each other (see FIG. 8).

A pole center alignment action of the permanent magnet of the motor rotor assembly according to the embodiment of the present invention will be described in detail with reference to FIGS. 4 to 8.

Figure 4:
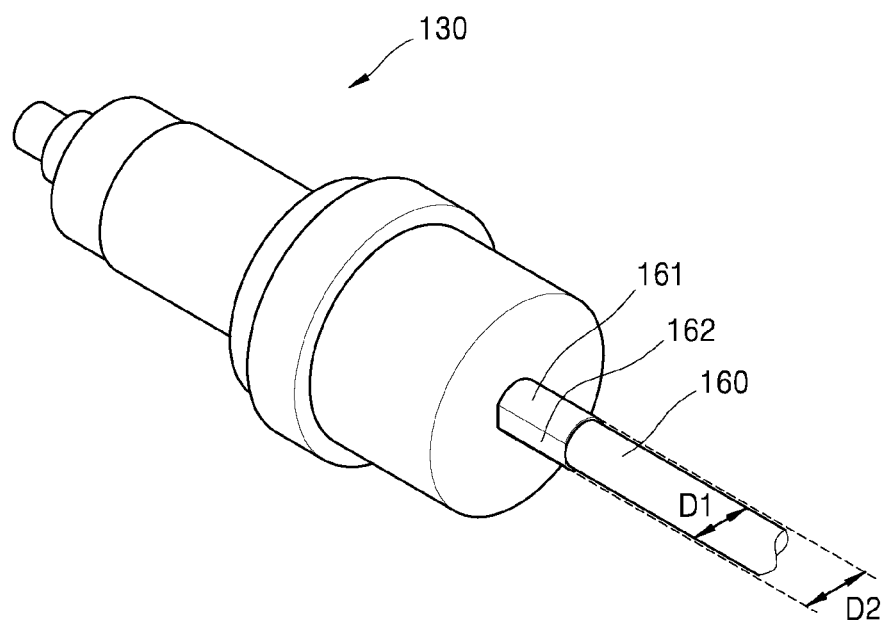
FIG. 4 is a partial schematic perspective view illustrating a first shaft and a part of a rod in the motor rotor structure according to one embodiment of the present invention.

FIG. 4 is a partial schematic perspective view illustrating the first shaft and a part of the rod in the motor rotor structure according to one embodiment of the present invention;

Referring to FIG. 4, it may be seen that the rod 160 protrudes from the center of the first shaft 130. The rod 160 may be circular other than a reference guide 161.

Specifically, the rod 160 includes the reference guide 161 for coupling at least one disc type magnet unit 1101 (hereinafter, reference disc type magnet unit 1101, see FIG. 5), which is a reference for aligning the pole centers, and for fixing a position of the reference disc type magnet unit 1101.

The reference guide 161 may be positioned close to the first shaft 130. This is because the rod 160 protrudes from the first shaft 130, and the reference disc type magnet unit 1101 (see FIG. 5) is assembled close to the first shaft 130 when first assembled. Accordingly, in a modified embodiment in which the rod 160 protrudes from the second shaft 150, the reference guide 161 may be positioned close to the second shaft 150.

As described above, the reference guide 161 guides a coupling direction of the reference disc type magnet unit 1101 (see FIG. 5), which is the reference for aligning the pole centers of the permanent magnet, and fixes a coupling position.

As a specific example, the reference guide 161 may have an expanded circular cross-section having a diameter D2 greater than a diameter D1 of the rod 160. In addition, the reference guide 161 may include at least one alignment pattern 162.

For example, at least one alignment pattern 162 may have a D-cut pattern (hereinafter, D-cut protrusion) formed on an outer circumferential surface of the reference guide 161. The coupling direction of the reference disc type magnet unit 1101 (see FIG. 5) is determined according to a position of the alignment pattern 162.

Figure 5:
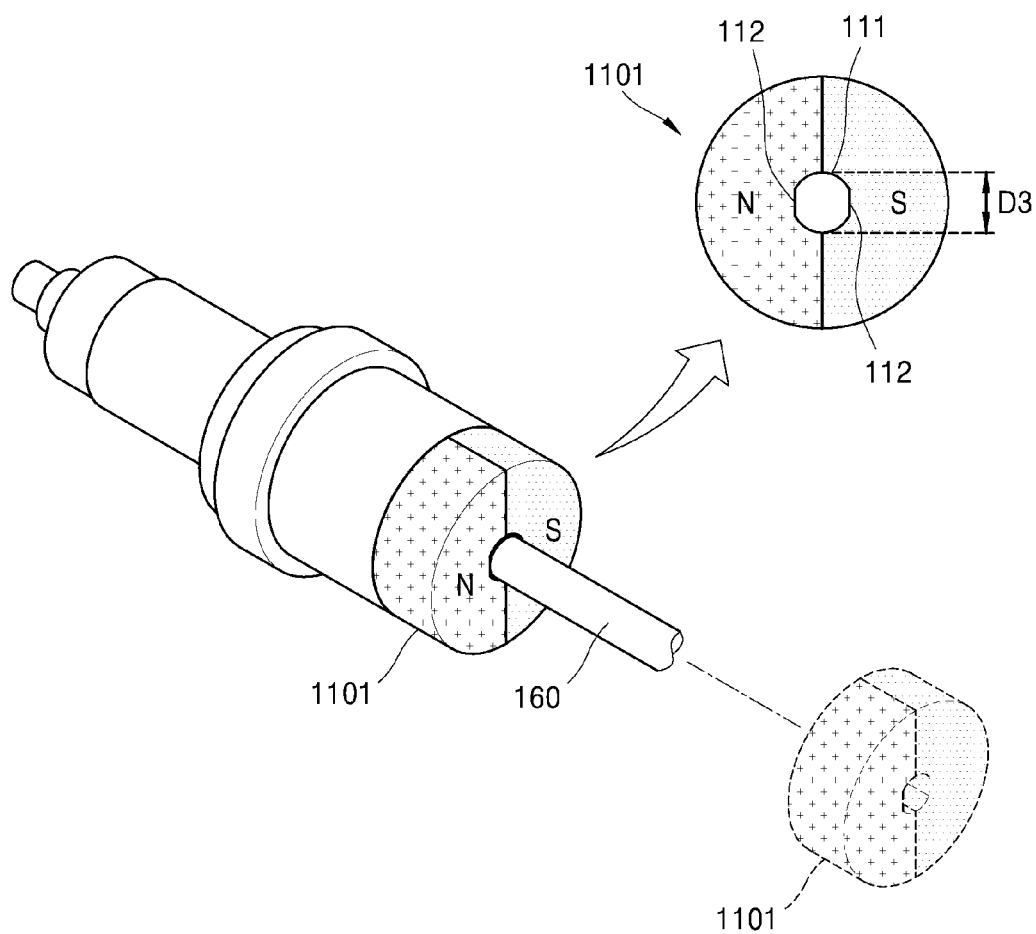
FIGS. 5 and 6 are views for describing a process of assembling a plurality of disc type magnet units in the motor rotor structure according to one embodiment of the present invention.

FIGS. 5 and 6 are views for describing a process of assembling the plurality of disc type magnet units in the motor rotor structure according to one embodiment of the present invention.

Referring to FIG. 5, a center hole 111 of the reference disc type magnet unit 1101 may have a diameter D3 having a size corresponding to the diameter D2 of the expanded cross-section of the reference guide 161 (see FIG. 4).

The reference disc type magnet unit 1101 may include the center hole 111 having the diameter D3 greater than diameters of the center holes of the remaining plurality of disc type magnet units 1102, 1103, and 1104 (see FIG. 6) which are assembled using the rod 160 later.

For example, an inner circumferential surface of the center hole of the reference disc type magnet unit 1101 is machined to reduce a magnetic force within a range of greater than 0% to 1% or less. Accordingly, the reference disc type magnet unit 1101 may have the center hole 111 having the diameter greater than the diameters of the center holes of the remaining plurality of disc type magnet units 1102, 1103, and 1104 (see FIG. 6). In a case in which the inner circumferential surface thereof is machined to reduce the magnetic force in a range of greater than 1%, performance degradation may occur, thus the inner circumferential surface thereof may be machined to reduce the magnetic force within a range of greater than 0% to less than maximum 1%.

In addition, the center hole 111 of the reference disc type magnet unit 1101 may include at least one alignment pattern coupling portion 112. In this case, at least one alignment pattern coupling portion 112 has a size and a form corresponding to at least one alignment pattern 162.

For example, as illustrated in FIG. 4, in the case in which at least one alignment pattern 162 has a D-cut protrusion form, the alignment pattern coupling portion 112 may have a D-cut groove form corresponding to the alignment pattern 162.

As described above, the reference disc type magnet unit 1101 including the alignment pattern coupling portion 112 corresponding to the alignment pattern 162 (see FIG. 4) is coupled to the reference guide 161 (see FIG. 4) and a position of the reference disc type magnet unit 1101 is fixed. Accordingly, in the present embodiment a reference of the pole center is determined such that an N-pole is disposed at a left side and an S-pole is disposed at a right side (see FIG. 5).

Meanwhile, in a state in which the plurality of disc type magnet units 1102, 1103, and 1104 (see FIG. 6) are completely assembled, the alignment pattern 162 (see FIG. 4) may also be used to determine a position of a magnetization point when full magnetization is performed. In other words, the alignment pattern 162 (see FIG. 4) may be used as a part for determining the magnetization point when the full magnetization is performed by positioning the alignment pattern 162 in a direction of a center of the N-pole or the S-pole.

Referring to FIG. 6, the reference disc type magnet unit 1101 and the remaining plurality of disc type magnet units 1102, 1103, and 1104 are sequentially assembled using the rod 160 protruding from the first shaft 130 to form the permanent magnet 110 segmented in the axial direction.

In this case, a small amount of magnetic force is individually generated in each of the remaining plurality of disc type magnet units 1102, 1103, and 1104 in addition to the reference disc type magnet unit 1101 before assembly.

The small amount of magnetic force is generated by individually applying a small amount of external magnetomotive force to each of the disc type magnet units 1101, 1102, 1103, and 1104.

In addition, the small amount of magnetic force is a magnetic force capable of generating a repulsive force and an attractive force between the plurality of disc type magnet units 1101, 1102, 1103, and 1104 adjacent to each other and aligning the pole centers thereof when the plurality of disc type magnet units 1101, 1102, 1103, and 1104 are assembled using the rod 160 in the axial direction.

Due to the action of the small magnetic force, the N-pole of the reference disc type magnet unit 1101 faces one surface of an S-pole of the disc type magnet unit 1102 assembled second due to the repulsive force and the attractive force therebetween.

In addition, the other surface of the S-pole of the disc type magnet unit 1102 which is assembled second faces one surface of an N-pole of the disc type magnet unit 1103 assembled third due to the repulsive force and the attractive force therebetween.

In addition, the other surface of the N-pole of the disc type magnet unit 1103 faces one surface of an S-pole of the disc type magnet unit 1104 assembled fourth due to the repulsive force and the attractive force therebetween.

As described above, although polarities of the magnets facing each other are not the same, the pole centers of the plurality of disc type magnet units 1101, 1102, 1103, and 1104 may be aligned due to the small amount of magnetic force.

Figure 7:
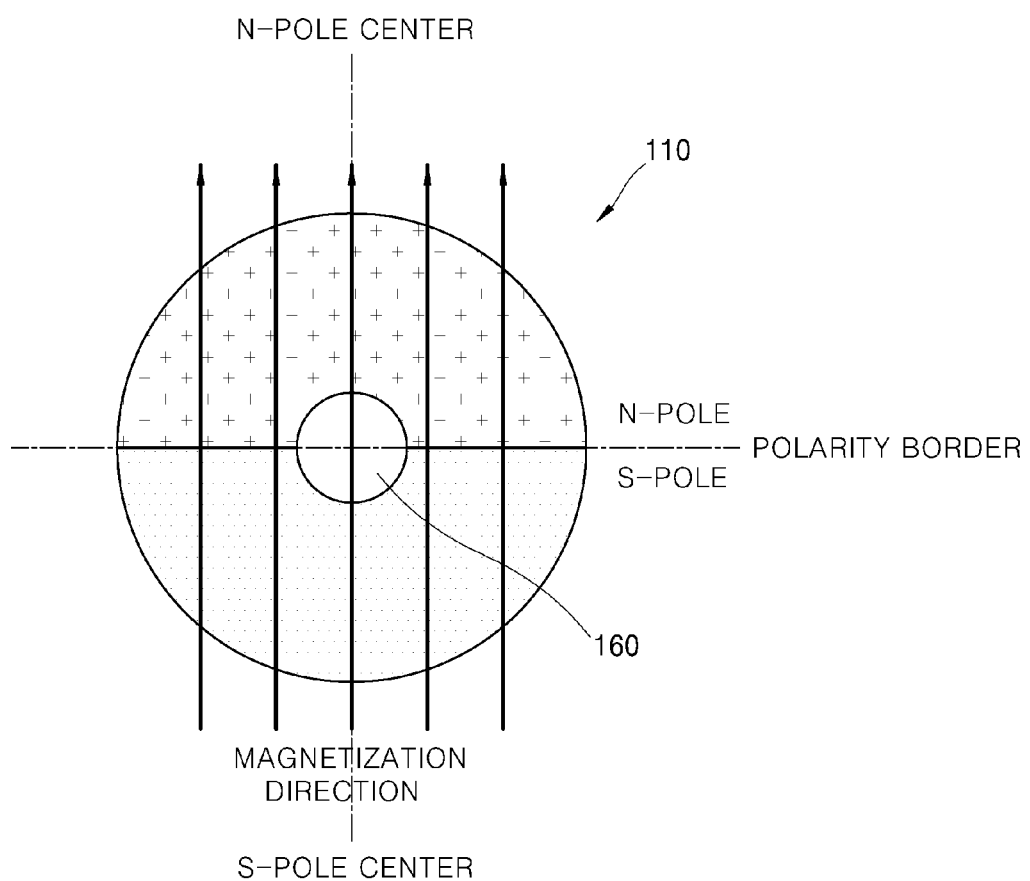
FIG. 7 is a view for describing a full magnetization process of the motor rotor structure according to one embodiment of the present invention.

FIG. 7 is a view for describing a full magnetization process of the motor rotor structure according to one embodiment of the present invention, and FIG. 8 is a view illustrating a form in which the polarities of all permanent magnets are aligned through the full magnetization process of the motor rotor structure according to one embodiment of the present invention.

Referring to FIG. 7, after the pole centers of the plurality of disc type magnet units 1101, 1102, 1103, and 1104 (see FIG. 6) are aligned as described above, full magnetization is performed in a magnetization direction indicated by an arrow.

In this case, the alignment pattern 162 (see FIG. 4) formed on the reference guide 161 (see FIG. 4) described with reference to FIG. 4 may be positioned in a direction of the center of the N-pole or S-pole. Accordingly, there is an advantage in that a magnetization point may be easily determined by the alignment pattern 162 (see FIG. 4) when the full magnetization is performed.

The polarities, which are adjacent to each other, of the plurality of disc type magnet units 1101, 1102, 1103, and 1104 (see FIG. 6) may be formed to be the same as illustrated in FIG. 8.

For example, referring to FIG. 8, due to the full magnetization according to the embodiment of the present invention, all the polarities, which are adjacent to each other, of the plurality of disc type magnet units 1101, 1102, 1103, and 1104 assembled with the rod 160 become the same.

Since the full magnetization process is performed as described above, the aligned polarities may be generated in the disc type magnet units 1101, 1102, 1103, and 1104 assembled such that the pole centers are aligned but the polarities are not aligned. In addition, the permanent magnet 110 may have a preset maximum magnetic force through the full magnetization.

As described above, in the structure and action according to one embodiment to of the present invention, there are advantages in that assembling is superior and individual machining is not needed for aligning center poles of remaining disc type magnet units rather than a disc type magnet unit which is a reference for aligning the center poles.

As the result, an effect of reducing a manufacturing period and machining cost may be achieved.

In addition, a small amount of magnetic force having only a sufficient magnitude to align the pole centers is generated in each of the plurality of disc type magnet units before assembly, and the plurality of disc type magnet units are fully magnetized after the assembly, and thus the polarities are aligned and a maximum magnetic force is obtained.

As the result, complex work such as boning work or inner circumferential surface machining for aligning the pole centers of the plurality of disc type magnet units is not needed and a conventional problem of misaligning pole centers may be prevented during an assembly process.

Specific effects of the present invention have been described in addition to the above described effects while the specific embodiments have been described to realize the present invention.

While the present invention has been described with reference to the illustrated drawings, it is clear that the present invention is not limited to the embodiments described in the specification and the drawings and may be variously modified by those skilled in the art within a range of the technical sprit of the present invention. In addition, although effects according to the structure of the present invention are not clearly described and explained while the embodiments of the present invention are described, effects predictable due to the corresponding structure should also be acknowledged.

What is claimed is:

1. A motor rotor assembly comprising:
   a permanent magnet including a plurality of disc type magnet units which have center holes and are segmented in an axial direction;
   a first shaft and a second shaft coupled to both end portions of the permanent magnet;
   a rod which protrudes from a center of the first shaft in the axial direction, is coupled to a center of the second shaft, and passes through the center hole of each of the plurality of disc type magnet units to assemble the permanent magnet, the rod including a reference guide at a portion of the rod on which at least one disc type magnet unit among the plurality of disc type magnet units is fixed and the remaining disc type magnet units rotatable on the remaining portions of the rod; and
   a sleeve which surrounds an outer circumferential surface of the permanent magnet and fixes the permanent magnet to the first and second shafts,
   wherein, when the plurality of disc type magnet units are assembled, the plurality of disc type magnet units are formed to have a small amount of magnetic force relative to a preset maximum magnetic force, such that pole centers of the disc type magnet units adjacent to each other are aligned to each other due to an attractive force and a repulsive force therebetween, and
   after the assembly, the plurality of disc type magnet units are fully magnetized to have the preset maximum magnetic force, such that polarities of the disc type magnet units, which are adjacent to each other, are formed to be the same.

2. The motor rotor assembly of claim 1, wherein the reference guide of the rod is positioned close to the first shaft, guides a coupling direction of the at least one disc type magnet unit, which is assembled first at the rod, among the plurality of disc type magnet units, and fixes a coupling position of the at least one disc type magnet unit.

3. The motor rotor assembly of claim 2, wherein the reference guide:
   has an expanded form to have a diameter greater than a diameter of the rod; and
   includes at least one alignment pattern.

4. The motor rotor assembly of claim 3, wherein the center hole of the at least one disc type magnet unit assembled first:
   has a diameter corresponding to the expanded diameter of the reference guide; and
   includes at least one alignment pattern coupling portion corresponding to the at least one alignment pattern.

5. The motor rotor assembly of claim 4, wherein the at least one alignment pattern includes at least one D-cut protrusion formed on an outer circumferential surface of the reference guide.

6. The motor rotor assembly of claim 5, wherein the at least one alignment pattern coupling portion includes at least one D-cut groove corresponding to the at least one D-cut protrusion.

7. The motor rotor assembly of claim 4, wherein an inner circumferential surface of the center hole of the at least one disc type magnet unit assembled first is machined such that a diameter of the center hole is increased in order to reduce a magnetic force within a range of greater than 0% to 1% or less.

8. The motor rotor assembly of claim 3, wherein the at least one alignment pattern guides a position corresponding to a full magnetization point after the plurality of disc type magnet units are assembled.

9. The motor rotor assembly of claim 1, wherein:
a male screw is formed on a protruding front end portion of the rod; and
a female screw is formed at the center of the second shaft coupled to the rod.

10. The motor rotor assembly of claim 9, wherein the male screw and the female screw have left-hand screw forms so as to prevent release when rotating.

11. A method of manufacturing a motor rotor assembly which includes a permanent magnet including a plurality of disc type magnet units which have center holes and are segmented in an axial direction, a first shaft and a second shaft coupled to both end portions of the permanent magnet, a rod which protrudes from a center of the first shaft in the axial direction, is coupled to a center of the second shaft, and passes through the center hole of each of the plurality of disc type magnet units to assemble the permanent magnet, and a sleeve which surrounds an outer circumferential surface of the permanent magnet and fixes the permanent magnet to the first and second shafts, the method comprising:
applying a small amount of magnetic force relative to a preset maximum magnetic force to the plurality of disc type magnet units to have the small amount of magnetic force by applying an external magnetomotive force to the plurality of disc type magnet units;
assembling the disc type magnet units in the axial direction using the rod and aligning pole centers of the plurality of disc type magnet units using an attractive force and a repulsive force between the disc type magnet units adjacent to each other; and
fully magnetizing the plurality of disc type magnet units to have the preset maximum magnetic force after fixing, by the sleeve, the plurality of disc type magnet units of which the pole centers are aligned.

12. The method of claim 11, wherein the rod includes a reference guide which is positioned close to the first shaft, the method further comprising,
assembling first at least one disc type magnet unit, at the rod at a position of the reference guide close to the first shaft, among the plurality of disc type magnet units.

13. The method of claim 12, wherein, in forming the reference guide at the rod, the reference guide:
is positioned at the rod to be close to the first shaft;
has an expanded form to have a diameter greater than a diameter of the rod; and
includes at least one alignment pattern.

14. The method of claim 13, further comprises coupling at least one corresponding alignment pattern coupling portion provided in the center hole of the at least one disc type magnet unit assembled first to the at least one alignment pattern of the reference guide.

15. The method of claim 14, wherein the at least one alignment pattern includes at least one D-cut protrusion formed on an outer circumferential surface of the reference guide.

16. The method of claim 15, wherein the at least one alignment pattern coupling portion includes at least one D-cut groove corresponding to the at least one D-cut protrusion.

17. The method of claim 14, further comprises machining an inner circumferential surface of the center hole of the at least one disc type magnet unit assembled first to increase a diameter of the center hole in order to reduce a magnetic force within a range of greater than 0% to 1% or less.

18. The method of claim 13, wherein, in the fully magnetizing, the method further comprising:
determining a position of the at least one alignment pattern; and
performing a process of the full magnetization.

19. The method of claim 11, wherein:
a male screw is formed on a protruding front end portion of the rod; and
a female screw is formed at the center of the second shaft coupled to the rod.

20. The method of claim 19, wherein the male screw and the female screw have left-hand screw forms so as to prevent release when rotating.

* * * * *